United States Patent [19]
Baumgart et al.

[11] Patent Number: 5,875,084
[45] Date of Patent: *Feb. 23, 1999

[54] MAGNETIC RECORDING DISK HAVING PROTRUSIONS CENTERED IN RESPECTIVE DEPRESSIONS

[75] Inventors: Peter Michael Baumgart, San Jose; Wing Pun Leung, Arcadia; Thao Anh Nguyen, San Jose; Andrew Ching Tam, Saratoga, all of Calif.

[73] Assignee: International Business Machines Corporation, Armonk, N.Y.

[ * ] Notice: The term of this patent shall not extend beyond the expiration date of Pat. No. 5,768,076.

[21] Appl. No.: 889,348

[22] Filed: Jul. 8, 1997

Related U.S. Application Data

[63] Continuation of Ser. No. 601,887, Feb. 15, 1996, Pat. No. 5,768,076, which is a continuation of Ser. No. 150,525, Nov. 10, 1993, abandoned.

[51] Int. Cl.$^6$ .............................. G11B 5/82; G11B 5/704
[52] U.S. Cl. .................................... 360/135; 428/694 TR; 428/694 BR; 428/694 SG
[58] Field of Search ..................... 360/135; 428/694 SG, 428/694 BR, 694 TR

[56] References Cited

U.S. PATENT DOCUMENTS

| | | | |
|---|---|---|---|
| 4,550,049 | 10/1985 | Ono et al. | 428/694 SG |
| 4,568,599 | 2/1986 | Ono et al. | 428/694 SG |
| 4,626,941 | 12/1986 | Sawada et al. | 360/135 |
| 4,664,963 | 5/1987 | Sakai et al. | 428/694 TR |
| 4,673,617 | 6/1987 | Yoshida et al. | 428/694 TR |
| 4,698,251 | 10/1987 | Fukada et al. | 360/135 |
| 4,725,472 | 2/1988 | Okabe et al. | 428/694 BR |
| 4,931,338 | 6/1990 | Toffle | 360/135 |
| 5,008,687 | 4/1991 | Longman et al. | 346/135.1 |
| 5,062,021 | 10/1991 | Ranjan et al. | 360/135 |
| 5,067,039 | 11/1991 | Godwin et al. | 360/135 |
| 5,070,425 | 12/1991 | Inumochi | 360/135 |
| 5,082,709 | 1/1992 | Suzuki et al. | 428/694 SG |
| 5,108,781 | 4/1992 | Ranjan et al. | 427/53.1 |
| 5,169,703 | 12/1992 | Miyazaki et al. | 428/694 SG |
| 5,285,343 | 2/1994 | Tanaka et al. | 360/135 |
| 5,388,020 | 2/1995 | Nakamura et al. | 360/135 |

FOREIGN PATENT DOCUMENTS

| | | | |
|---|---|---|---|
| 5-11622 | 11/1992 | European Pat. Off. | 360/135 |
| 56-090427 | 7/1981 | Japan | 360/135 |
| 57-020925 | 2/1982 | Japan | 360/135 |
| 63-225919 | 9/1988 | Japan | 360/135 |
| 4-028012 | 1/1992 | Japan | 360/135 |
| 4-321928 | 11/1992 | Japan | 360/135 |
| 5-012648 | 1/1993 | Japan | 360/135 |
| 5-314470 | 11/1993 | Japan | 360/135 |

*Primary Examiner*—Craig A. Renner
*Attorney, Agent, or Firm*—Gray Cary Ware Friedenrich

[57] ABSTRACT

A process for creating a "distant bump array" surface texture in a magnetic recording disk for reducing stiction and the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile such as a smooth dimple or one with a central protrusion useful for low stiction without close spacing or elevated "roughness". Some bump profiles permit texturing of the data-storage region of the disk surface for low stiction without materially affecting magnetic data storage density.

23 Claims, 10 Drawing Sheets

MAGNETIC RECORDING DISK HAVING PROTRUSIONS CENTERED IN RESPECTIVE DEPRESSIONS

CROSS REFERENCE TO RELATED APPLICATION

This application is a continuation of application Ser. No. 08/601,887 filed Feb. 15, 1996, now U.S. Pat. No. 5,768,076, issued Jun. 16, 1998, which is a FWC of application Ser. No. 08/150,525 filed Nov. 10, 1993, now abandoned.

CROSS-REFERENCES TO RELATED APPLICATIONS

This application is related by common inventorship and subject matter to the U.S. Pat. No. 5,595,791, entitled "PROCESS FOR TEXTURING BRITTLE GLASS DISKS", which is entirely incorporated herein by this reference.

BACKGROUND OF THE INVENTION

1. Field of the Invention

This invention relates generally to rotating data storage devices and specifically to rotating magnetic disks having controlled surface topology for reducing magnetic head contact and dwell stiction upon startup and stopping of disk rotation and improving disk durability.

2. Description of the Related Art

Modern data storage devices include magnetic disk drives such as the Direct Access Storage Device (DASD) employing one or more disks rotated on a central axis in combination with magnetic heads positioned closely to the disk recording surfaces for transducing recorded magnetic signals. Recent magnetic disk drive designs employ a commonly denominated Contact Start-Stop (CSS) system in which the magnetic head is in contact with the magnetic disk surface when the disk is stationary. When the disk starts to rotate, the magnetic head slides along the surface, eventually flying fully lifted from the surface because of laminar air flow at the disk surface.

A smooth, specular recording surface is preferred in the art to permit the magnetic head to ride as closely as possible to the disk surface. However, for extremely smooth disk and head air-bearing surfaces, excessive contact stiction and friction is developed during startup and stopping of disk rotation, resulting in the need for higher torque motors, disk wear and eventual disk failure. The possible solution known in the art for this "stiction" problem is to reserve a "textured" region of the rotating disk surface for magnetic head contact during CSS. The surface texture in the "CSS region" reduces the contact stiction and friction. The magnetic head is moved to the CSS region at the appropriate times by the drive controller. The specular smoothness of the remainder of the disk surface is retained to permit high-density magnetic data recording.

Until recently, texturizing of the CSS region of the disk surface was usually accomplished by contact abrasion means using mechanical abrasive pads or powders to increase surface "roughness" in a random manner (see FIG. 1A). Chemical etching methods are also known for use with special disk substrate materials, including nonmetals. These mechanical and chemical techniques are relatively uncontrollable and expensive, lacking precision, tool reliability and speed. Because CSS region texturing is needed in modern and future disk drives for stiction reduction, there has long been a clearly-felt need for improved CSS region texturing techniques and materials.

In U.S. Pat. No. 4,626,941, Shigetomo Sawada et al. disclose a disk texturing technique designed to suppress lubricant evaporation and enhance lubricant adhesion to the rotating disk surface. Sawada et al. suggest sandblasting, machining and like methods for roughening of the outer disk surface.

In U.S. Pat. No. 5,008,687, Robert J. Longman et al. disclose a data storage medium having a textured surface pattern consisting of an arrangement of grooves or protuberances, the pitch of which is smaller than the shortest wavelength within the electromagnetic radiation bands employed for magnetic data storage. Longman et al. teach the use of their sub-micron surface textures to enhance signal-to-noise ratios (SNRs) in certain alloy compositions used for magnetic data storage. They neither consider nor suggest the application of their textures to the magnetic head stiction problem in CSS disk drives.

In U.S. Pat. No. 4,698,251, Yasutaka Fukuda et al. disclose the use of concentric scratch marks formed on the surface of the disk to create magnetic anisotropy in the magnetic surface layer deposited on the scratched surface. Fukuda et al. use the mechanical grooves to force domain anisotropy in the later-deposited magnetic layer in a well-known manner and neither consider nor suggest the application of their mechanical scratching technique to the magnetic head stiction problem in CSS disk drives.

Several practitioners have suggested improved texturing techniques for reducing magnetic head stiction in CSS applications. For instance, in U.S. Pat. No. 5,070,425, Mitsuo Inumochi discloses a disk surface grooving technique designed to minimize head stiction over the entire surface. Inumochi teaches the use of two groups of streaks or grooves, with the streaks in one group crossing those in the second group at a controlled angle, thereby reducing the dynamic friction between the magnetic head and the magnetic disk. Inumochi doesn't discuss the serious problem of data storage errors arising from the disturbed surface topography at the boundaries of each of his grooves and offers no assurances that his invention is workable in combination with high data storage densities.

In U.S. Pat. Nos. 5,062,021 and 5,108,781, Rajiv Y. Ranjan et al. disclose a process for manufacturing selectively textured magnetic recording media employing a flashlamp-pumped neodymium-yttrium-aluminum-garnet (Nd:YAG) laser of the type well-known for use in laser trimming systems. Ranjan et al. teach the use of a series of closely-spaced craters to increase the disk surface roughness over a CSS region (see FIGS. 1B–1D). Their laser pulse frequency in combination with the disk rotational speed controls the pattern of overlapping laser craters in the disk surface. Although Ranjan et al. show that the coefficient of friction between the magnetic head and a disk surface textured in accordance with the method of their invention remains low over many thousands of CSS cycles, the surface texture created by the method of their invention (see FIGS. 1E–1F) is too rough to sustain high-density magnetic data storage. Moreover, the individual closely-spaced craters on the disk surface are not uniform (FIG. 1D) because of overlap and the controllability limits of the laser texturing method of their invention. Also, Ranjan et al consider only the crater-type profile shown in FIGS. 1B–1D and neither teach nor suggest creation of other useful profiles.

Accordingly, there is a clearly-felt need in the art for an improved disk texturing technique without process disadvantages such as limited controllability and loss of high-density data storage capacity in the textured area. Also, a crater-shaped dimple with a relatively rough rim is less desirable in terms of durability, flyability, and dwell stiction control when compared to bumps having a smooth central dome as the highest topographical feature. These unresolved problems and deficiencies are clearly felt in the art and are solved by this invention in the manner described below.

SUMMARY OF THE INVENTION

This invention solves the above problems by using a tightly focused diode-pumped neodymium-yttrium-lithium-floride (Nd:YLF) or neodymium-yttrium-vanadate (Nd:YVO$_4$) solid-state laser to create a "distant bump array" texture in the disk surface. This new "distant bump array" geometry includes bumps having a new topographical profile that is possible only because of the properly controllable fluence achieved with the solid-state laser pulse. This controllably uniform and smooth bump profile for the first time permits creation of a "distant bump array" of bumps separated by large distances relative to bump size. The method of this invention arises from the unexpectedly advantageous discovery that proper control of laser parameters such as fluence, pulse duration and spot size provides bump geometry so uniform and repeatable that reduced stiction is available even from a sparse bump arrangement that is not "rough" in the usual sense.

It is an object of this invention to provide a disk surface texturing method that reduces stiction without affecting data recording density. It is an unexpected advantage of the "distant bump array" geometry of this invention that the disk surface texture can be controlled such that the disk data recording density is not materially affected by low-stiction textures.

It is another object of this invention to provide a new bump profile having a smooth central projecting feature rising above the nominal surface plane of the surrounding disk surface. It is an unexpected advantage of the system of this invention that laser-induced bumps in the disk surface can be controllably created with a new bump profile having a central protrusion rising above the surrounding rim and surrounding surface level. Moreover, it is yet another advantage of this invention that these new bump profiles can be uniformly repeated many times over the textured region of a disk surface.

It is yet another object of this invention to increase the manufacturing throughput rate of the disk texturing process of this invention. It is a feature and yet another advantage of this invention that the use of diode-pumped laser pulsing at lower absolute power levels permits the texturing of magnetic recording disks at higher manufacturing throughput rates than is possible in the prior art.

It is yet another advantage of the texturing method of this invention that texturing of an entire disk surface can be accomplished to permit "emergency landing" of the magnetic head anywhere in the data region of the disk surface without significant stiction and without significant loss of data storage capacity.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1B:
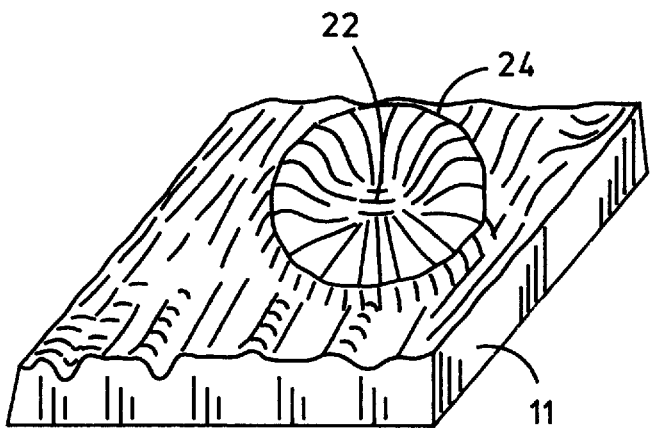
FIGS. 1A–1F show selected bump profiles and disk surface textures from the prior art.
Figure 1C:
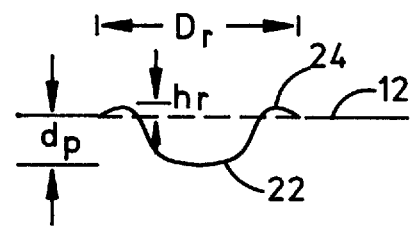
Figure 1E:
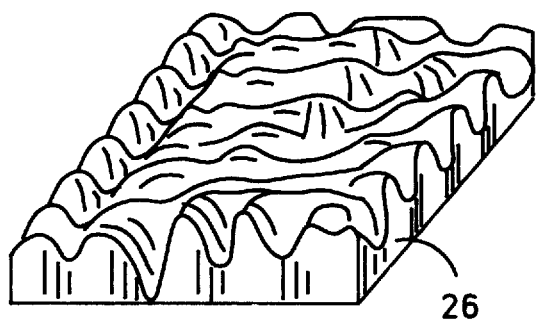
Figure 1A:
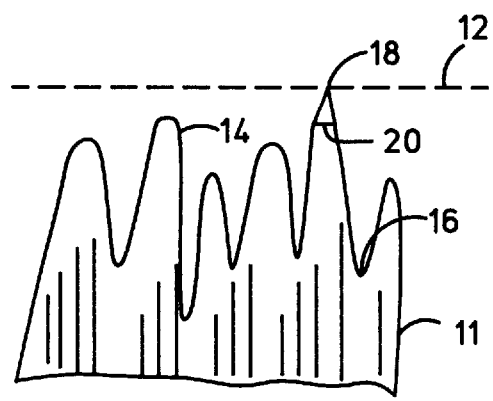

FIG. 1A shows a disk substrate 11 having a nominal surface plane 12 and a surface texture obtained with a mechanical technique known in the prior art. Depending on the selected grit size and the nature of paper or cloth supporting the grit, substrate 11 is textured to a selected roughness to provide a head contact region of low stiction. The textured surface includes peaks exemplified by peak 14 and indentations exemplified by indentation 16, which are characteristic of mechanically roughened surfaces. Because of the cutting action of the grit, no portion of the roughened surface extends above the nominal surface plane 12 except for particles broken loose from the surface, exemplified by the particle 18. As particles such as particle 18 are broken from the sharp peaks during operation, many of the peaks become flattened as exemplified by the peak surface 20. Thus, as is known in the art, mechanically roughened disk substrate surfaces offer two serious disadvantages: (a) shedding of contaminating particulates such as particle 18 and (b) gradual flattening of peak surfaces leading to stiction increases responsive to Contact Start-Stop (CSS) cycling.

A recent nonmechanical texturing technique is first disclosed in the above-cited Ranjan et al. patent. Ranjan et al. employ a laser texturing process to produce a "roughened surface" composed of overlapping laser-induced craters of the type shown in FIGS. 1B–1C. Depending on the peak energy intensity and pulse duration of the laser, a "fluence" of radiant energy is presented to outer disk surface 11 in FIG. 1B over a target area. The radiant energy fluence heats the surface rapidly, melting a portion of the surface material, which then rapidly cools to form a characteristic change in the surface topography over the target area. This changed topography includes a central depression 22 that extends below nominal surface plane 12 and a peripheral elevation 24 that substantially surrounds central depression 22 and extends above nominal surface plane 12. FIG. 1C shows the symbolic nomenclature used herein to describe the height $h_r$ of surrounding elevation 24, the depth $d_p$ of central depression 22 and the maximum diametral dimension $D_r$ of the crater formed in the target area. Maximum diametral dimension $D_r$ herein denominates the largest breadth of the topographically-disturbed expanse in the target area on disk substrate 11 and encompasses both central depression 22 and substantially all of peripheral elevation 24.

Figure 1F:
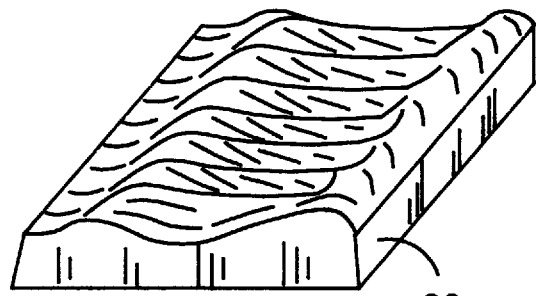

FIGS. 1E and 1F show illustrative surface roughnesses resulting from a plurality of overlapping laser-induced craters in a specular outer surface 26. FIG. 1E illustrates the surface resulting from overlapping craters that are substantially circular, being produced by substantially normally-incident laser pulses. FIG. 1F illustrates the surface resulting from overlapping elliptical craters produced by obliquely-incident laser pulses. The advantages of laser-induced surface roughness exemplified by the surfaces in FIGS. 1E–1F include (a) the absence of sharp peaks that may be broken off to form undesirable flats such as peak surface 20 in FIG. 1A, and (b) a general presence of rounded peaks that are elevated above nominal surface plane 12 (see FIG. 1C). The disadvantage of the surfaces shown in FIGS. 1E–1F include the chaotic surface texture that is unsuited for the storage of magnetic data at the desired densities normally associated with specular data storage surfaces and also offers less control over the mechanical performance of the head-disk interface.

Figure 2A:
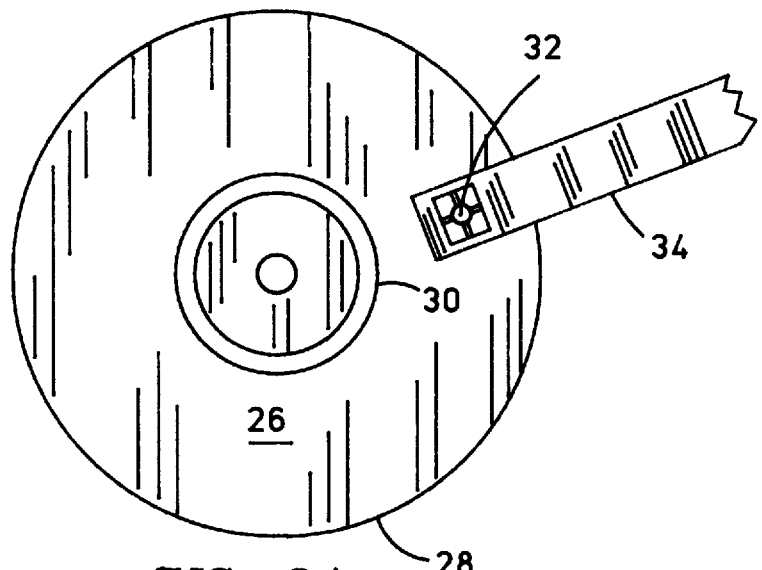
FIGS. 2A–2B show a rotatable rigid magnetic recording disk and a magnetic head from the prior art including a sectional view of disk surface layers.
Figure 2B:
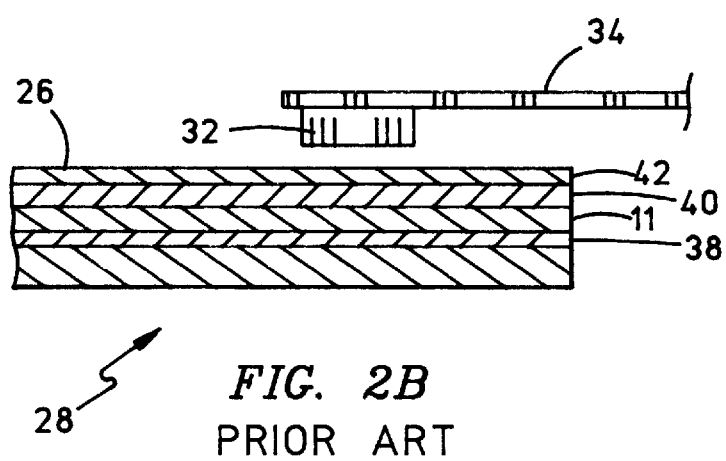

FIGS. 2A–2B show a magnetic storage disk 28 having specular outer surface 26 and a roughened annular region 30 for use in Contact Start-Stop (CSS) cycling of the magnetic head 32. Magnetic head 32 is mounted on the arm 34, which is connected to means (not shown) for positioning head 32 in a generally radial direction with respect to rotating disk 28. In particular, head 32 is positioned over roughened annular region 30 whenever the rotation of disk 28 is started or stopped.

Specular outer surface 26 of disk 28 (FIG. 2B) may cover several layers of intervening materials. For instance, substrate layer 11 may be formed on one or more underlying layers exemplified by layer 38 and then polished to a desired specular smoothness. The specular surface of substrate layer 11 may be roughened before deposition of a magnetic layer 40 and a protective layer 42, whereby the surface topographical features are reproduced at the surface of each subsequent layer deposited. Alternatively, any of the layers above substrate layer 11 may first be deposited and then roughened in accordance with the method of this invention. Thus, "outer surface" 26 is used herein to denominate the surface of whichever of layers 11, 38, 40, and 42 is modified topographically in accordance with the process of this invention. Ultimately, the surface of protective layer 42 will exhibit the desired roughness in the CSS region provided by roughened annular region 30.

Figure 1D:
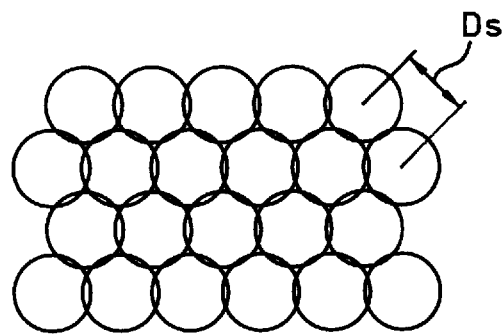

The overlapping pattern generally used in the prior art is shown in FIG. 1D. Minimum spacing distance $D_s$ herein denominates the center-to-center spacing of the nearest adjacent pair of laser-induced craters. As seen in FIG. 1D, the minimum separation distance $D_s$ in the art is usually less than and never more than the largest diametral dimension $D_r$ for the bump. This relationship forces significant overlap between crater profiles and produces a chaotic surface texture.

Figure 3:
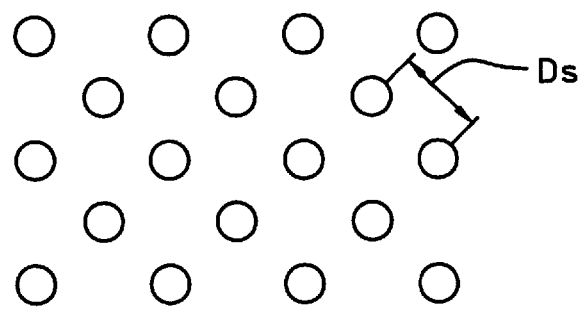
FIG. 3 shows a schematic representation of the "distant bump array" texture pattern of this invention.

An important element of this invention is the "spaced-apart" bump geometry heretofore unknown in the art, herein denominated the "distant bump array" and arranged as shown in FIG. 3. The important characteristic of the distant bump array as used herein is that the minimum separation distance $D_s$ is never less than 200% of the largest diametral dimension $D_r$ of the laser-induced bump. Heretofore, such sparse array geometry was not considered useful for reducing stiction because over 90% of the textured surface retains the high-stiction specular finish initially provided. However, as the inventors unexpectedly discovered, the distant bump array of FIG. 3 provides very low stiction over many thousands of repeated CCS cycles even though less than 10% of the surface is covered with the particularly closely-controlled bump profiles of this invention shown in FIGS. 4A–4B and especially 5A–5B.

Figure 4A:
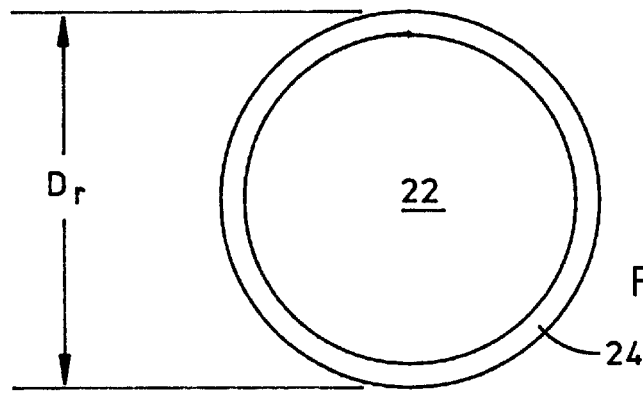
FIGS. 4A–4B show schematic representations of facial and cross-sectional profile views of a surrounded bump design of FIG. 1B from the prior art.
Figure 4B:
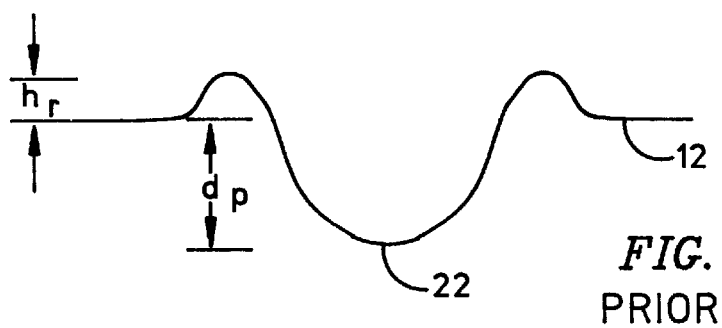

FIGS. 4A–4B and 5A–5B show the two different bump profiles created by the process of this invention as implemented by the exemplary apparatus shown in FIG. 6. FIGS. 4A–4B show a bump profile substantially similar to the one discussed above in connection with FIGS. 1B–1C, having central depression 22 and peripheral elevation 24. Although the bump in FIG. 4A is shown as substantially circular, elliptical bumps with elevation profiles similar to that shown in FIG. 4B can be easily created using oblique incidence angles for the laser energy fluence. The largest diametral dimension $D_r$ herein denominates the largest dimension of such an elliptical bump. Similarly, as shown in FIG. 4B, the central depression 22 depth $d_p$ herein denominates the maximum depth of central depression 22 below nominal plane 12 and the peripheral elevation height $h_r$ herein denominates the maximum height of peripheral elevation 24 above nominal plane 12.

Figure 5A:
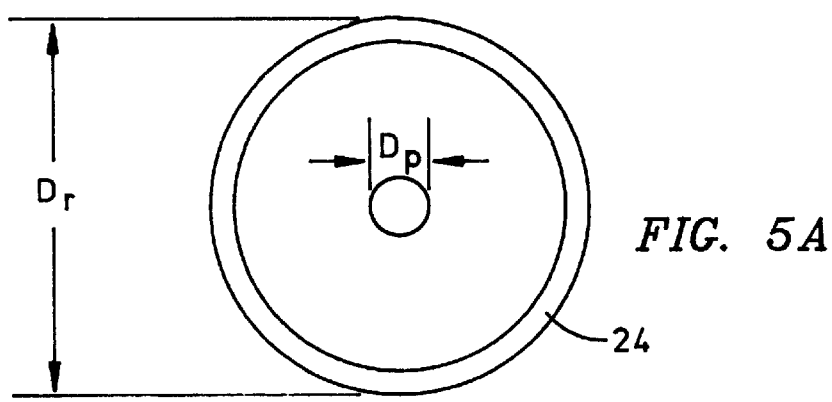
FIGS. 5A–5B show schematic representations of facial and cross-sectional profile views of the central protrusion bump design of this invention.
Figure 5B:
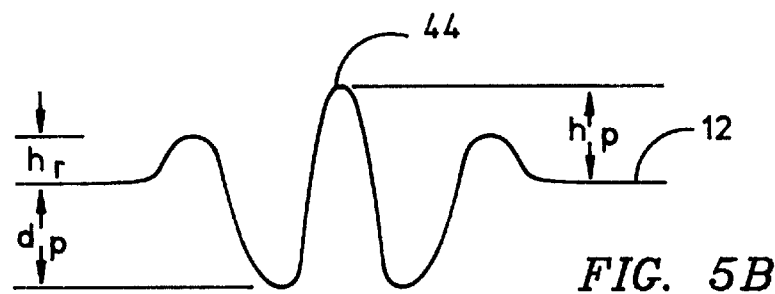

FIGS. 5A–5B show the second bump profile of this invention, which is similar to that shown in FIG. 4A–4B except for the presence of a central protrusion 44 located substantially in the middle of central depression 22 and extending to a height $h_p$ above nominal plane 12. Thus, examination of FIG. 5B shows that central protrusion 28 rises above the floor of central depression 22 by distance equal to the sum of height $h_p$ and depth $d_p$. A value for central protrusion height $h_p$ that is somewhat greater than the value of peripheral elevation height $h_r$ is preferred. The values of $h_p$ and $h_r$ depend on various laser and disk-material parameters such as laser fluence, pulse width, spot size and disk surface composition.

Figure 6A:
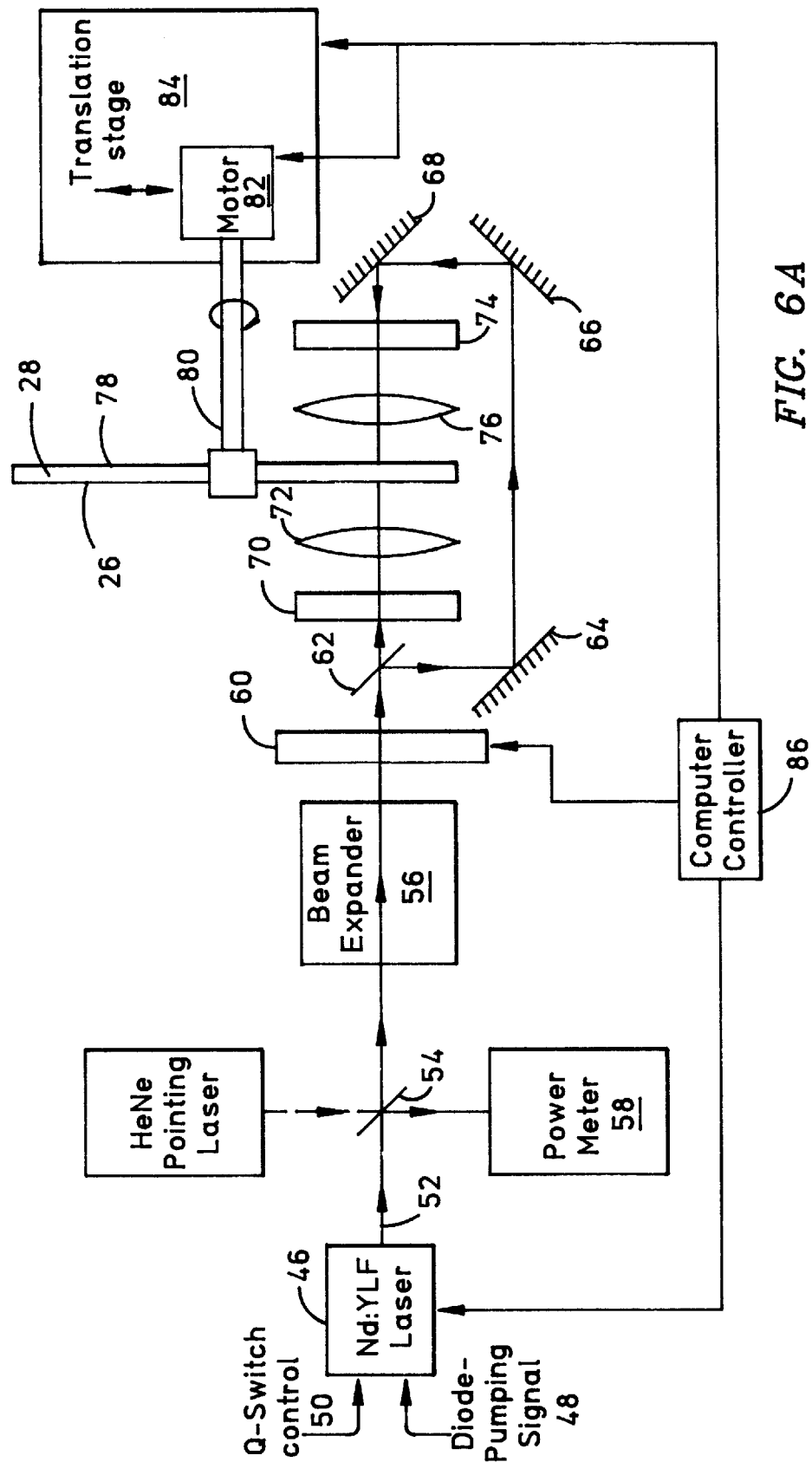
FIGS. 6A–6B show functional schematic optical layouts of asymmetrical and symmetrical embodiments of the texturing apparatus of this invention for producing the "distant bump array" texture pattern of FIG. 3 on a disk surface.

FIG. 6A provides a functional schematic representation of an exemplary apparatus for creating the "distant bump array" texture pattern discussed above in connection with FIG. 3. A Nd:YLF or Nd:YVO$_4$ solid-state laser 46, controlled by diode-pumping signal 48 and Q-switch control 50, generates a series of laser pulses 52 having, for example, twenty microjoules of energy. By beam-splitting and directing the laser energy in a 0.3–90 nanosecond pulse over a laser spot diameter of about 10 micrometers, the thermally-affected volume at the laser spot is much reduced over the prior art. Also, the high stability of the diode-pumped solid-state laser results in a more controlled and reproducible bump profile. The laser pulses 52 are passed through a partial-reflecting mirror 54, with the main pulse energy passing through a beam expander 56. A predetermined portion of the laser pulse energy is diverted to a power meter 58 to monitor the pulse power.

The laser pulse from beam expander 56 is passed through a computer-controlled shutter 60 and therefrom to a second partial-reflecting mirror 62. Mirror 62 splits the laser pulse into two different pulses of substantially equivalent energy. The first of these two pulses from mirror 62 is directed around a loop formed by three full-reflecting mirrors 64, 66 and 68. The second of the two laser pulses passes through mirror 62 and therefrom through the variable attenuator 70, the objective lens 72 and therefrom to outer surface 26 on one side of magnetic disk 28. In similar fashion, the second laser pulse from mirror 68 is passed through the variable attenuator 74 and the objective lens 76 to outer surface 78 on the reverse side of magnetic disk 28.

Magnetic disk 28 is rotated on a shaft 80 under control of a motor 82. The entire rotating assembly formed by motor 82, shaft 80 and disk 28 is translated by the translation stage 84 in such a manner so as to permit adjustment of the radial location of the target area for both laser pulses on surfaces 26 and 78 of disk 28. The operation of translation stage 84, motor 82, shutter 60 and laser 46 are coordinated and controlled by the computer controller 86, which is programmed to create a plurality of bumps on both surfaces of disk 28 in a pattern similar to that discussed above in connection with FIG. 3.

Figure 6B:
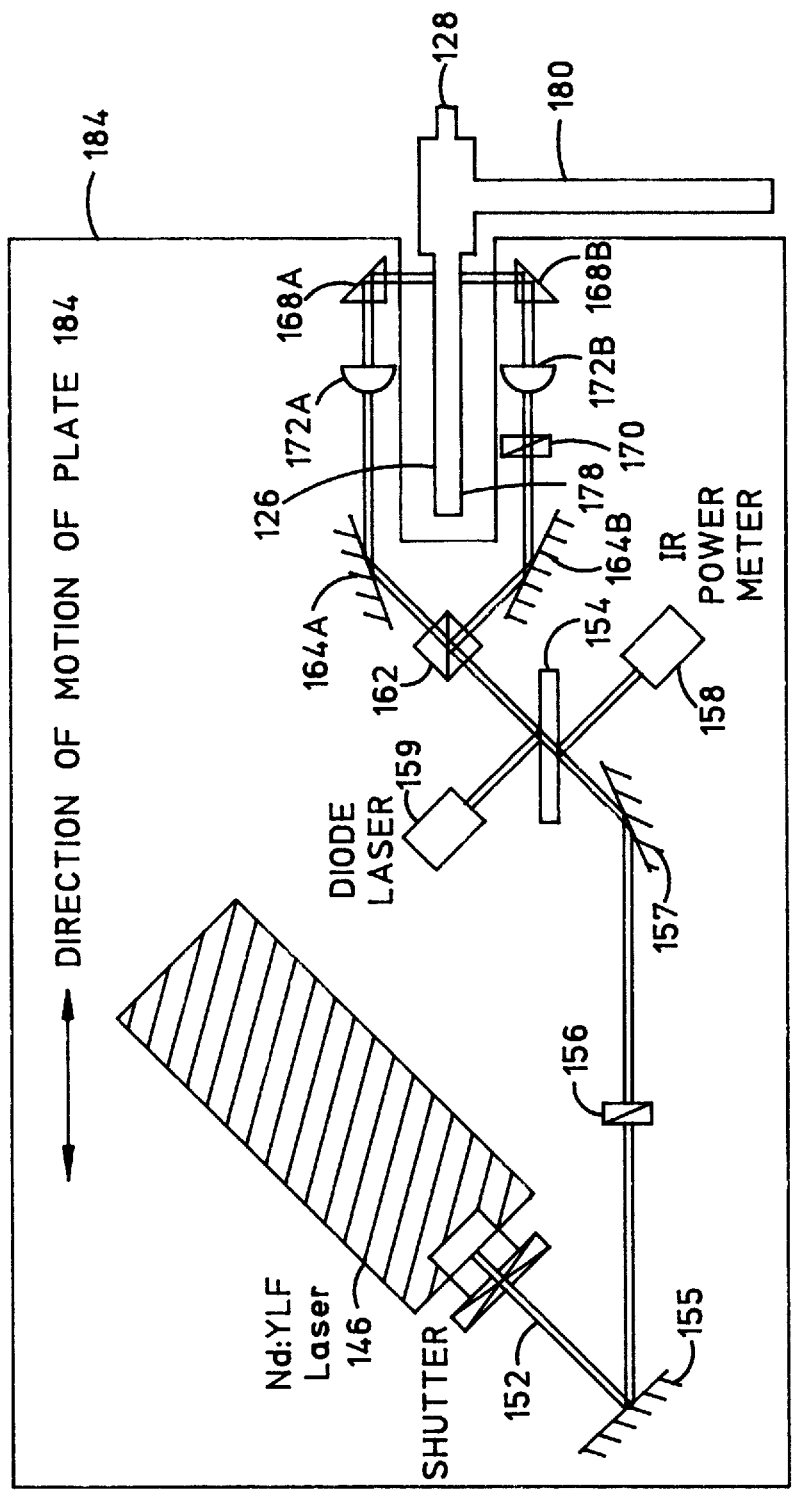

FIG. 6B provides a functional schematic representation of an exemplary apparatus for creating the texture pattern discussed above in connection with FIG. 3. The apparatus in FIG. 6B differs from that discussed above in connection with FIG. 6A in that the laser pulses 152 are passed along two identical paths from a cube beam splitter 162 to the two sides 126 and 178 of the magnetic disk 128.

As in FIG. 6A, a Nd:YLF or Nd:YVO$_4$ solid-state laser 146 generates a series of laser pulses 152 having, for example, twenty microjoules of energy. The laser pulses 152 are directed to a first steering mirror 155 and therefrom through a cold mirror attenuator 156 to a second steering mirror 157. Laser pulses 152 bounce from mirror 157 to a beam combiner 154. Beam combiner 154 operates to split a portion from laser pulses 152 and to direct this portion to a power meter 158. A diode laser 159 is also provided for system alignment purposes. The main laser pulses 152 pass through beam combiner 154 to cube beam splitter 162.

Cube beam splitter 162 splits the laser pulse into two different pulses of substantially equivalent energy. Each of these two pulses from splitter 162 is directed around a loop consisting of a full-reflecting mirror 164A or 164B, an objective lens 172A or 172B, and a reflecting prism 168A or 168B. One of the two symmetric paths includes a variable attenuator 170 to permit power balancing at the target. Magnetic disk 128 is rotated on a spindle 180, which is controlled similarly to shaft 80 discussed above in connection with FIG. 6A.

In FIG. 6B, the translation motion is applied to the movable plate 184, which contains the laser and beam directing apparatus instead of the disk drive motor (not shown). The symmetric beam paths provided by the apparatus shown in FIG. 6B may be essential for some disk texturing applications.

The optical layout shown in FIG. 6A is acceptable if the slight inequivalence in the laser beams on the two sides 26 and 78 of disk 28 can be tolerated. This slight inequivalence arises from the use of additional components in one of the two beams from mirror 62. The increased beam propagation distance may also be significant because of beam divergence. If high equivalence of the texture on both sides 26 and 78 is required, then the symmetrical optical layout shown in FIG. 6B is preferred.

By controlling the minimum separation distance $D_s$ (FIG. 3), laser pulse energy, pulse length and pulse spot size, a wide variety of bump profiles are possible, including those with central protrusions instead of central depressions (e.g., FIG. 5B). As an example, the inventors have produced the textured region in FIG. 8B, which is composed of a "distant bump array" wherein each bump has a central peak substantially as shown in FIG. 4B. A Nd:YLF laser was Q-switched at a repetition rate of 10 kHz, disk 28 was rotated at several revolutions per second and simultaneously translated linearly to form a "spiral" of distant bumps. For the preferred texture durability, the shape and height of each such bump should be nearly identical, which is achieved through the careful choice of laser source as well as the precise control of the Q-switch pulses.

Diode-pumped solid-state lasers are more stable than the flashlamp-pumped solid-state laser known in the art because of strong reduction in the thermal profile produced in the laser crystal. A proper laser source is important because it minimizes the "thermal blooming" of the laser medium such that the beam profile and energy fluctuations are minimized. The inventors have found the laser-diode-pumped Nd:YLF laser to be superior to the flashlamp-pumped Nd:YAG laser used in the prior art. A proper Q-switch pulse control technique is important because the laser energy is expected to vary during the startup transient time because of energy storage in the Nd:YLF crystal. In the system of this invention shown in FIG. 6, shutter 60 is employed to pass the laser pulse train only after stabilization of the Q-switch energy levels.

The inventors have found that a solid-state diode-pumped neodymium-yttrium-vanadate (Nd:YVO$_4$) laser is also suitable for use with the method of this invention because it can provide the proper combination of pulse duration, energy fluence and spot size necessary for creation of the bump profiles of this invention. The inventors suspect that other lasers capable of controlled laser pulse duration of from 10 to 50 nanoseconds may be useful for producing the central-protrusion bump profiles of this invention provided that the proper combination of pulse duration, energy fluence and spot size can be controllably and reliably produced by such laser.

Figure 7:
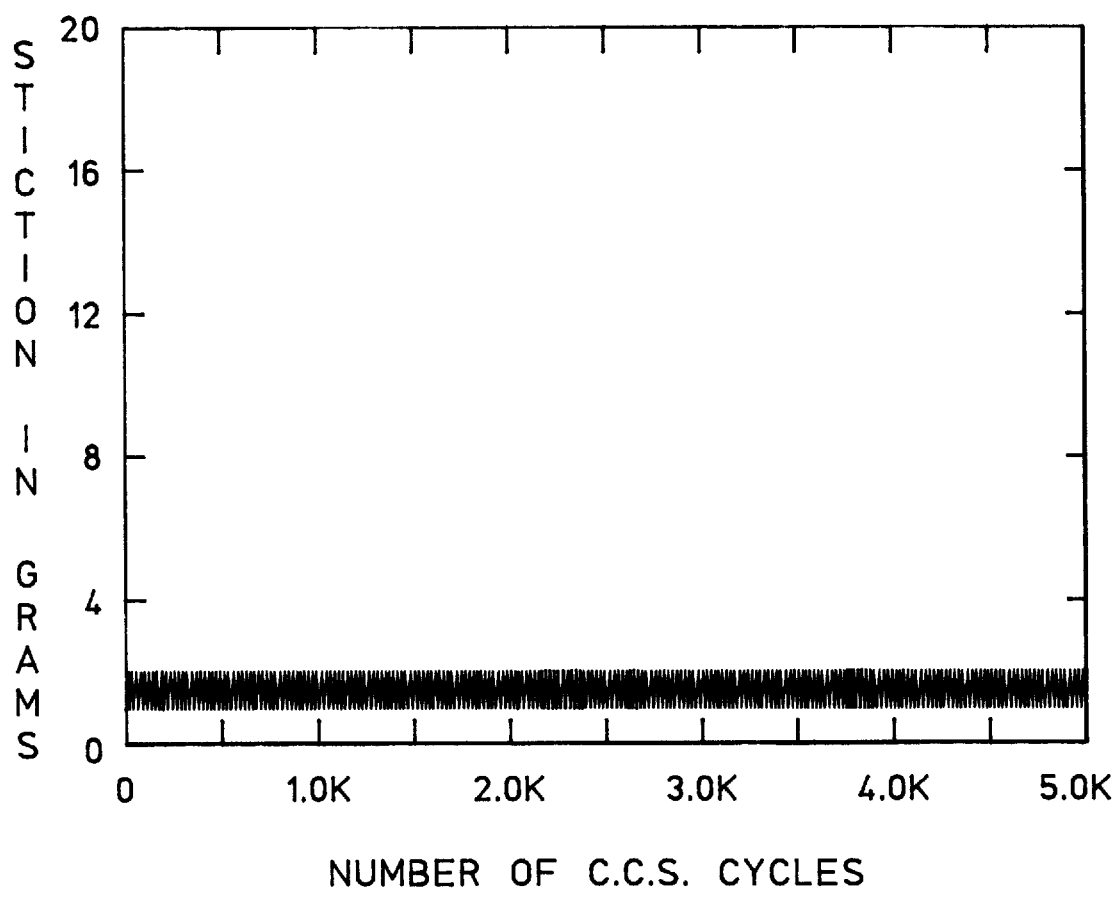
FIG. 7 shows measured stiction in grams-force as a function of Contact Start-Stop (CSS) cycles for an embodiment of the disk texture of this invention.
Figure 8A:
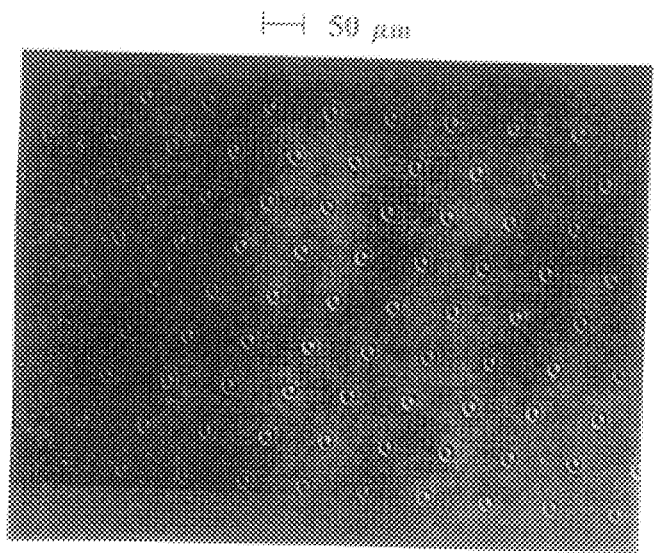
FIGS. 8A–8B show exemplary microphotographs of the "distant bump array" disk texture of this invention.
Figure 8B:
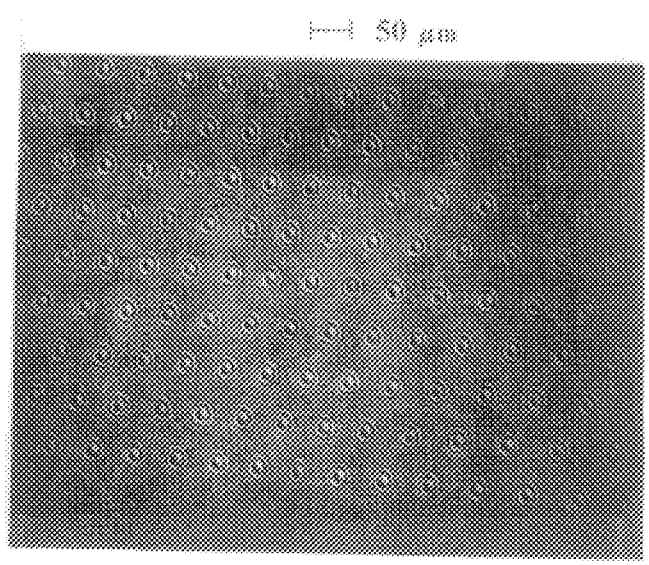

The inventors have textured a CSS region on many thousands of disks using the distant bump array texture pattern exemplified in FIG. 3. FIGS. 8A–8B show two examples of microphotographs of such textured surfaces on a nickel-phosphorous substrate surface for $D_s$=50 micrometers. After generating the bumps in accordance with the above discussion in connection with FIG. 6, the disks are washed and the surface then covered with a magnetic film deposition and protective film deposition layer and then lubricated. Following final deposition, each disk was then tested for stiction and functional performance over several thousand CSS cycles in the textured region. FIG. 7 shows a typical measured value for stiction in grams-force as a function of the number of CSS cycles for a slider over the textured region of a disk substrate. The tests were conducted using 1.5 nanometers of ZDOL lube in a 10% relative humidity environment. As seen in FIG. 7, the stiction data are found to be very repeatable and always remain below two grams-force. As is known in the art, stiction measured on a similar surface without texture is expected to be over 100 grams-force and increases sharply with the increasing numbers of CSS cycles.

The distant bump array geometry of this invention includes substantially uniform individual smooth rounded bump profiles that, depending on laser pulse fluence, may include a central protrusion rising above the nominal surface plane. An example of a workable texture includes many such bumps with central protrusions, with a maximum central protrusion height $h_p$ of perhaps 25 nanometers, a protrusion diameter $D_p$ of about seven micrometers, a diametral dimension $D_r$ of about 15 micrometers, and a maximum separation distance $D_s$ of about 50–200 micrometers.

It will be appreciated that the preferred geometry just described results in retaining over 90% of the textured surface with undisturbed specular finish and provides a total central protrusion surface (contact) area of less than 0.01%. Because the elevated central protrusion surface area represents the only area normally in contact with a resting magnetic head air-bearing surface, the contact stiction arising therefrom is extremely low, as confirmed experimentally. Moreover, because over 90% of the surface topography is left undisturbed by the texturing process of this invention, high-density data may be recorded over the textured region of the disk surface at 90% of the usual density.

The texture pattern of this invention can be accomplished on NiP disk substrate surfaces or on finished overcoated magnetic disks, or on other surfaces intermediate in the fabrication process. Because the distant bump array geometry provides reduced stiction, enhanced durability and also permits the reading and writing of high-density magnetic data within the CSS region, the texturing pattern of this invention can be used over the entire surface of the disk. This capability is entirely unknown in the art and would permit low-stiction landing of the head anywhere on the disk surface, such as is necessary during "emergency landing" of the head slider.

The inventors also found that slightly higher laser pulse fluences can produce a bump having two or more concentric "rims". For instance, the bump shown in FIG. 9C exhibits a concentric depression in the middle of the the central protrusion. In some applications these "depressed" protrusion profiles may offer additional significant topographical advantages.

Figure 9A:
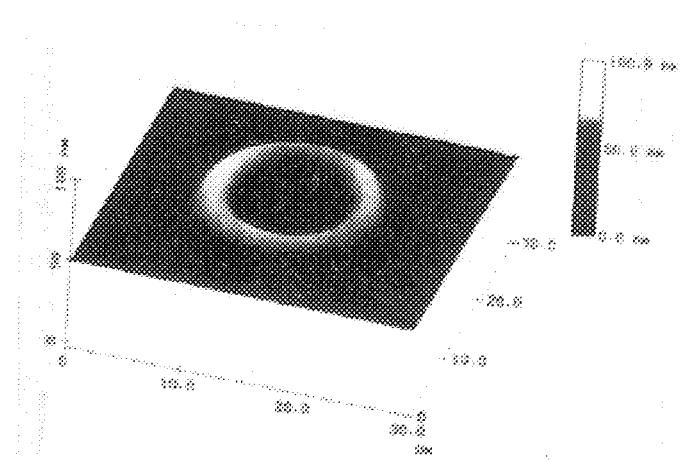
FIGS. 9A–9C show exemplary Atomic Force Microscope (AFM) images of the bump designs adapted to the disk surface texture pattern of this invention.
Figure 9B:
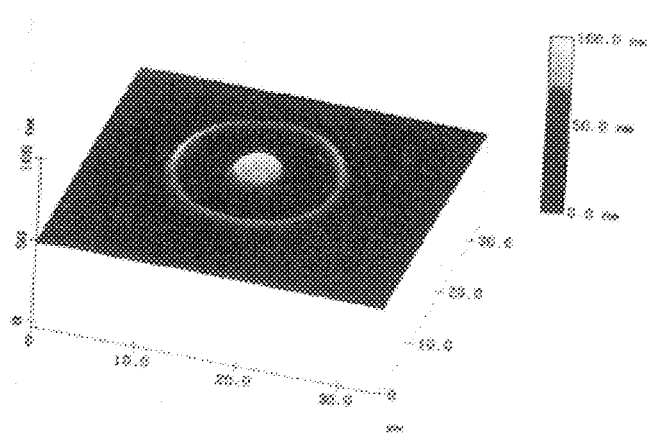
Figure 9C:
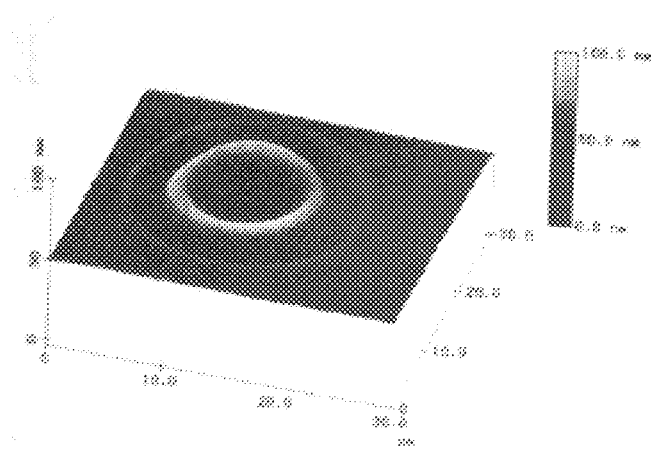

The inventors speculate that the central protrusion is produced at intermediate laser pulse fluences as a result of a thermal shock wave that echoes off the periphery while the center material is still molten, although no evidence has been developed to prove this hypothesis. The Atomic Force Microscope (AFM) pictures in FIGS. 9A–9C show actual bumps produced with substantially 1.0 J/cm$^2$ (FIG. 9A), 1.5 J/cm$^2$ (FIG. 9B) and 2.0 J/cm$^2$ (FIG. 9C). Although nickel-phosphorous crystallizes above 300° C. and may become magnetic, this crystallization does not occur using the laser pulses of short duration preferred for the process of this invention. At the higher pulse fluences, the central protrusion develops the miniature central depression mentioned above in connection with FIG. 9C, perhaps as a result of higher temperatures and longer resolidification time for the centermost material.

Figure 10:
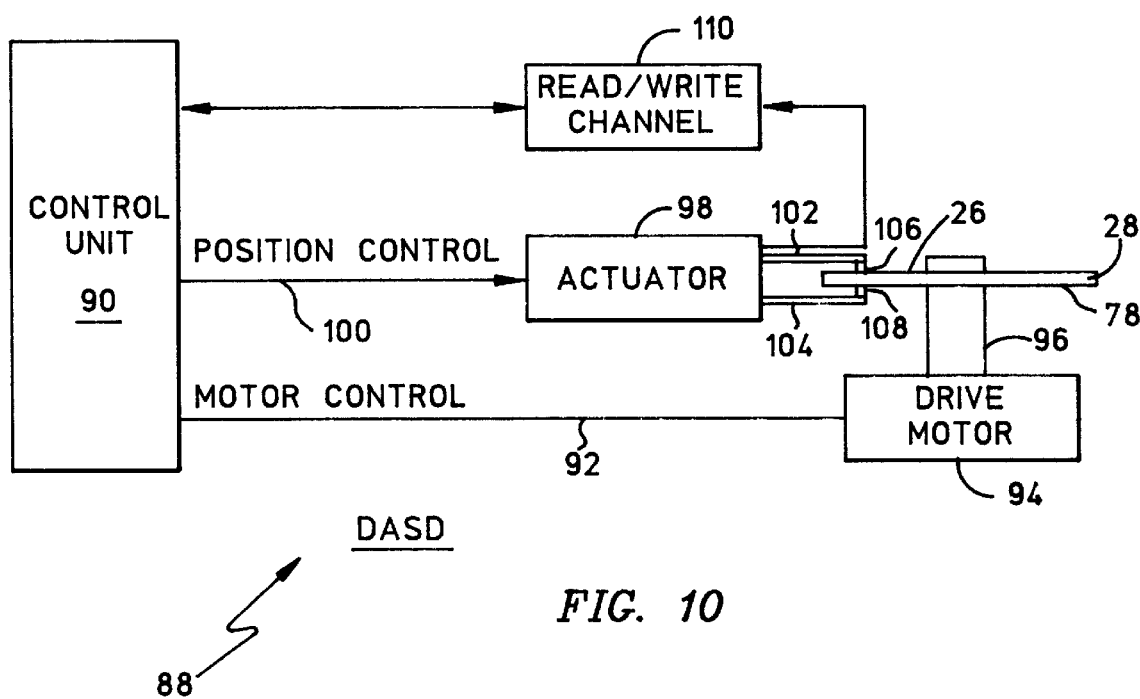
FIG. 10 shows a functional block diagram of a Direct Access Storage Device (DASD) incorporating the textured disk surface of this invention.

FIG. 10 shows a functional block diagram of a Direct Access Storage Device (DASD) 88 employing the textured disk 28 of this invention. DASD 88 includes a control unit 90, which coordinates the operation of all elements with rotating disk 28. Control unit 90 provides a motor control signal 92 to a drive motor 94, which rotates disk 28 through shaft 96. Control unit 90 operates an actuator 98 through a position control line 100. Actuator 98 is mechanically coupled through two flexible members 102 and 104 to two magnetic heads 106 and 108, respectively. Magnetic head 106 is disposed to read and write data on surface 26 of disk 28 and head 108 is similarly disposed to read and write data on reverse surface 78 of rotating disk 28. Heads 106 and 108 are coupled through a read/write channel 110 to control unit 90, whereby the digital data is transferred to and from rotating disk 28.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A Direct Access Storage Device (DASD) for reading and storing data, said DASD comprising:

a magnetic recording disk having a substrate with a substrate surface and a magnetizable film layer on the substrate surface, the film layer having an outer surface with a nominal surface plane for storing magnetically-readable data;

a magnetic head and means for supporting said head in a selected orientation for generally radial controlled movement relative to said disk;

said outer surface including an annular data region with a specular surface and an adjacent annular second region including a plurality of spaced-apart asperities, each asperity having a largest diametral dimension $D_r$ about a center thereof, said each asperity comprising a depression extending toward said substrate surface to a depth $d_p$ below said nominal surface plane, and a central protrusion with a height $h_p$ above the nominal surface plane centered in said depression;

said plurality of spaced-apart asperities having their centers separated from one another by a minimum separation distance $D_s \geq D_r$;

for said each asperity, said central depression depth $d_p$ being in the interval from 1 to 250 nanometers, and said largest diametral dimension $D_r$ being in the interval from 1 to 125 micrometers; and said height $h_p$ of said plurality of spaced apart asperities being higher above the nominal surface plane than any asperity that is not one of said plurality of spaced apart asperities.

2. A magnetic recording disk having an outer surface with a nominal surface plane for storing magnetically-readable data, said disk comprising:

a layer of substantially rigid substrate material having a substantially planar substrate surface;

a magnetizable film layer deposited over said substrate surface having a substantially uniform thickness and a substantially planar recording surface;

said outer surface including a plurality of spaced-apart circular asperities, each asperity having a largest diametral dimension $D_r$ about a center thereof, said each asperity comprising a substantially circular depression extending toward said substrate surface to a depth $d_p$ below said nominal surface plane, a central protrusion centered in each said depression extending to a height $h_p$ above said nominal surface plane leaving an annulus-shaped portion of said depression surrounding the central protrusion, said height $h_p$ being a single highest elevation above the nominal surface plane; and said plurality of spaced-apart asperities having their centers uniformly separated from one another by a minimum separation distance $D_s \geq 2D_r$.

3. The magnetic recording disk of claim 2 wherein, for said each asperity, said largest diametral dimension $D_r$ is in the interval from 1 to 125 micrometers, said central protrusion height $h_p$ is in the interval from 1 to 100 nanometers and said minimum separation distance $D_s$ is less than 500 micrometers.

4. The magnetic recording disk of claim 2 further comprising:

a protective film deposited over said recording surface to form a layer having a substantially uniform thickness and a substantially planar protective surface.

5. A magnetic recording medium comprising:

a disk which has a substrate layer with a substrate surface, the substrate surface having a nominal surface plane;

said disk having a plurality of substantially identical spaced apart circular-shaped asperities on the substrate surface, each asperity having a diameter $D_r$;

each asperity comprising a non-annular dome-shaped protrusion so as to provide the substrate surface of the disk with a plurality of dome-shaped protrusions;

each dome-shaped protrusion having a substantially common height $h_p$ above the nominal surface plane and a center with respect to said nominal surface plane;

the common height $h_p$ being the single highest elevation of the substrate layer above the nominal surface plane;

said plurality of dome-shaped protrusions being uniformly shaped and having their centers separated from one another by a minimum separation distance $D_s \geq 2D_r$; and each asperity including an annulus-shaped depression below the nominal surface plane and circumscribing the dome-shaped protrusion with the dome-shaped protrusion centered within the annulus-shaped depression.

6. A disk drive including the magnetic recording medium as claimed in claim 5, the drive comprising:

a rotatable support for supporting the disk for rotation;

a suspension supporting a magnetic head;

disk rotating means connected to said rotatable support for rotating the disk past the magnetic head in a transducing relationship therewith;

positioning means connected to the suspension for moving the magnetic head to multiple positions with respect to the disk so as to process signals with respect to multiple tracks on the disk as the disk rotates; and control means connected to the magnetic head, the disk rotating means and the positioning means for controlling and processing signals with respect to the magnetic head, for controlling movement of the disk and for controlling the position of the magnetic head.

7. A magnetic recording medium as claimed in claim 5 comprising:

the substrate layer having been textured with a laser to provide said dome-shaped protrusions;

the substrate layer being NiP; and a magnetic layer covering the substrate layer which replicates said asperities, whereby a slider will engage only dome-shaped protrusions replicated by the magnetic layer upon contact start and stop.

8. A magnetic recording medium as claimed in claim 5 comprising:

the dome-shaped protrusions being located only in an annular band on the substrate surface of said disk.

9. A magnetic recording medium as claimed in claim 5 comprising:

the dome-shaped protrusions being located over the entire substrate surface of the disk.

10. A magnetic recording medium as claimed in claim 5 wherein the dome-shaped protrusions are uniformly spaced.

11. A magnetic recording medium as claimed in claim 5 comprising:

the common height $h_p$ being in the range 1–100 nm.

12. A magnetic recording medium as claimed in claim 11 comprising:

the common height $h_p$ being substantially 25 nm.

13. A magnetic recording medium as claimed in claim 5 comprising:

the minimum separation distance $D_s$ between the centers of the dome-shaped protrusions being at least about 50 µm but less than 500 µm.

14. A magnetic recording medium as claimed in claim 13 comprising:

the minimum separation distance $D_s$ between the centers of the dome-shaped protrusions being in the range of about 50–200 µm.

15. A magnetic recording medium as claimed in claim 14 comprising:

the minimum separation distance $D_s$ between the centers of the dome-shaped protrusions being substantially 50 µm.

16. A magnetic recording medium as claimed in claim 5 comprising:

the substrate layer being NiP;

each dome-shaped protrusion having substantially circular cross sections which are parallel to said nominal surface plane and which progressively decrease in cross section away from said depression; and each dome-shaped protrusion having a rounded top.

17. A magnetic recording medium as claimed in claim 16 comprising:

the common height $h_p$ being in the range of 1–100 nm.

18. A magnetic recording medium as claimed in claim 17 comprising:

the minimum separation distance $D_s$ between the centers of the dome-shaped protrusions being at least about 50 µm but less than 500 µm.

19. A magnetic recording medium as claimed in claim 18 comprising:

the minimum separation distance $D_s$ between the centers of the dome-shaped protrusions being in the range of about 50–200 µm.

20. A disk drive including the magnetic recording medium as claimed in claim 19, drive comprising:

a rotatable support for supporting the disk for rotation;

a suspension supporting a magnetic head;

disk rotating means connected to said rotatable support for rotating the disk past the magnetic head in a transducing relationship therewith;

positioning means connected to the suspension for moving the magnetic head to multiple positions with respect to the disk so as to process signals with respect to multiple tracks on the disk as the disk rotates; and control means connected to the magnetic head, the disk rotating means and the positioning means for controlling and processing signals with respect to the magnetic head, for controlling rotation of the disk and for controlling the position of the magnetic head.

21. A magnetic recording medium as claimed in claim 19 comprising:

the common height $h_p$ being substantially 25 nm.

22. A magnetic recording medium as claimed in claim 21 comprising:

each dome-shaped protrusion having a largest circular cross section which has a diameter substantially equal to 7 µm.

23. A magnetic recording medium as claimed in claim 22 comprising:

the minimum separation distance $D_s$ between the centers of the dome-shaped protrusions being substantially 50 µm.

* * * * *